Figure 1:
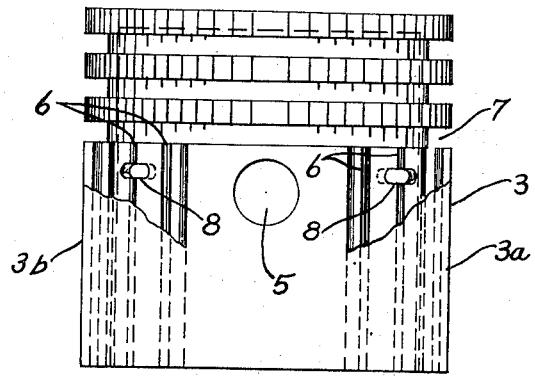

Feb. 22, 1949.　　　G. C. RAMSPECK　　　2,462,550
PISTON
Filed June 13, 1946

INVENTOR.
George C. Ramspeck
BY Edward W. Weisert
His Attorney

Patented Feb. 22, 1949

2,462,550

UNITED STATES PATENT OFFICE 2,462,550

PISTON

George C. Ramspeck, Chicago, Ill.

Application June 13, 1946, Serial No. 676,528

3 Claims. (Cl. 309—12)

This invention relates to a piston and concerns itself primarily with a structure that can readily be expanded or adjusted to produce a proper fit in the piston cylinder, and that at the same time will be maintained at satisfactory temperatures.

According to this invention, the wall of the piston is provided with two or more expansion slots that extend from the bottom to the first ring groove and are preferably located upon the sectors extending between the wrist pin bosses. These slots are preferably made to communicate with the interior of the piston adjacent their upper ends to provide for the circulation of oil for carrying off the heat.

The invention comprises the novel structure and combination of parts hereinafter described and more particularly pointed out and defined in the appended claims.

Figure 2:
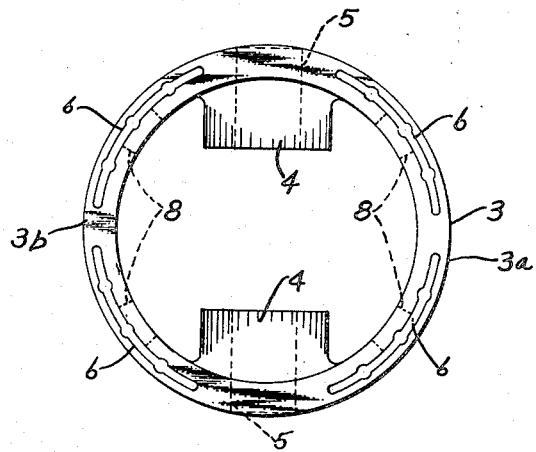

In the accompanying drawing which illustrates a preferred form of this invention and in which similar reference numerals refer to similar features in the different views:

Fig. 1 is an elevational view with parts shown in section of a piston involving this invention; and Fig. 2 is a bottom plan view of the same.

In referring now to the drawing, there is shown a conventional type of piston which may be made of any suitable material and provided with the usual wrist pin bosses 4 which extend inwardly and form the usual wrist pin bearing apertures 5. The diameter extending through these apertures divides the wall of the piston, which it will be noted is hollow, into two diametrically opposite sections 3a and 3b. Each sector 3a and 3b is provided with one or more expansion slots 6 which may be termed elongated. In the present instance, two slots 6 are shown in each sector, but the number may be varied and the length of the slots may be varied. These slots 6 extend from the bottom of the piston to the first ring groove 7 or throughout the length of the skirt of the piston and adjacent the upper portions of the slot outlet passages or ports 8 may be provided that extend from the slots to the interior of the piston for the circulation of oil for conveying the heat from the piston walls. The ports may be somewhat elongated as shown in dotted lines in Fig. 2. These slots 6 may be formed in any suitable manner. Spaced holes may be drilled in the skirt portion of the wall and the metal between the holes cut away. But it is immaterial how the slots are formed.

It will be appreciated that these slots render it possible for the wall of the piston to be expanded by suitable means or tools inserted therein after it wears. At the same time, the slots provide a very copious medium for the circulation of the oil from the bottom of the piston to the upper interior of the skirt which conveys the heat and lowers the temperature of the piston.

I am aware that attempts have been made to provide small circular passages in the walls of pistons through which oil may circulate if such passages do not become clogged up as they often do but such passages do not provide for expansion as the expansion slots involving this invention. According to this invention, it will be noted, that the expansion slots extend throughout a large portion of each sector 3a and 3b making it possible for the same to serve as expansion slots.

It will be appreciated that this invention will not only prolong the life of a piston, it will also provide a more satisfactory and smoother operation in that it tends to reduce the usual expansion that arises from overheating of the piston wall.

I am aware that many changes may be made and various details of construction modified without departing from the principles of this invention so I do not propose limiting the patent granted otherwise than necessitated by the appended claims.

I claim as my invention:

1. A piston having a skirt consisting of a single piece of metal with diametrically opposite wrist pin bearings and opposed sectors upon opposite sides of the diameter passing through said bearings, each sector having a plurality of expansion slots extending from the bottom of the piston to the top of the skirt and extending over the larger portion of the circumferential area of said sectors with passages extending from each slot to the interior of the piston, said slots being adapted for receiving expanding means.

2. A piston having a skirt portion consisting of a single piece of material with diametrically opposite wrist pin bearings and opposed sectors upon opposite sides of the diameter passing thru said bearings, each sector having a slot extending from the bottom of the piston to the top of the skirt adapted for the insertion of an expanding tool for expanding said piston, each slot extending over a substantial circumferential area of its sector and having communication with the interior of the piston at its upper end.

3. A piston having a one-piece skirt portion with diametrically opposite wrist pin bearings and opposed sectors upon opposite sides of a diameter passing thru said bearings, each sector having a slot extending from the bottom of the piston to the top of the said skirt and adapted for receiving expanding means for expanding the piston, each slot extending over a substantial circumferential area of its sector and having an outlet into the interior of the piston at its upper end.

GEORGE C. RAMSPECK.

REFERENCES CITED

The following references are of record in the file of this patent:

UNITED STATES PATENTS

| Number | Name | Date |
| --- | --- | --- |
| 1,772,931 | Dusevoir | Aug. 12, 1930 |
| 1,779,555 | Minnick | Oct. 28, 1930 |